UNITED STATES PATENT OFFICE.

CHARLES G. OTIS, OF TROY, NEW YORK.

IMPROVED COMPOUND FOR FEEDING STOCK.

Specification forming part of Letters Patent No. 59,255, dated October 30, 1866.

*To all whom it may concern:*

Be it known that I, CHARLES G. OTIS, of Troy, in the county of Rensselaer and State of New York, have invented a new and Improved Concentrated Pressed Feed for Stock; and I do hereby declare the following to be a full, clear, and exact description of the same, sufficient to enable one skilled in the art to which the invention appertains to make use of it.

The improvement consists in a combination of farinaceous and oleaginous matters in certain proportions, and compressed into water and vermin proof packages for transportation.

The object is by the ingredients of the compound—namely, ground oats and corn, with a small amount of oil or flaxseed-meal—to afford a less weighty but more nutritious ration for horses and mules; and, secondly, by the mode of packing, to protect the feed from the ordinary casualties which attend its storage and transportation to distant parts.

The cost of transporting grain from the Missouri river to the posts where it is consumed far exceeds its primary cost.

The object of my plan is to furnish a ration which shall weigh less and yet fill the place of the present ration. To accomplish this object, I propose to reduce the ration of grain to eight (8) pounds for horses and six (6) pounds for mules, substituting for the present ration of unground grain a mixture of corn and oats ground, with the addition of a small proportion of oil or flaxseed-meal, the whole pressed as hard as possible by machinery made for that purpose, and securely put up in convenient packages for transportation. When practicable, the ground feed should be mixed with chopped hay or straw, and the whole well moistened before feeding.

The advantages of this plan are numerous, among which are, first, economy in transportation at least thirty-three and one-third per cent.; second, production of a superior article of feed; third, it is perfectly protected from the weather and from ravages of vermin, &c.; fourth, immunity from loss through careless handling while being transported, as there are no sacks or bags to burst or decay; fifth, economy of space in storing same.

The feeding of oats and corn ground together is no novelty, but is practiced by horse-railroad companies, keepers of livery-stables, and many other persons who keep large numbers of horses and other animals for draft purposes, and who study with care the economical feeding of their stock; but the plan of reducing the bulk of the ration by pressure, for the purpose of reducing the cost of transportation, and at the same time furnishing an equally valuable ration of less bulk and weight, I believe to be new.

The grain used on the plains for horse-feed consists entirely of corn. Experience has demonstrated to my entire satisfaction that it is not the proper food, being too heating in its nature. While serving on the plains with my regiment—the Twenty-first New York Volunteer Cavalry—I lost many valuable animals from colic, caused by feeding corn and exercising them immediately after.

Horses fed entirely upon corn become stiff, and easily founder, and do not travel with the same elasticity as horses fed on oats or ground feed. A marked instance of this fact can be seen on the overland stage-route. East of the Rocky Mountains the feed is corn, west of the mountains their feed is oats. Any one who has passed over the route cannot have failed to notice the difference in the stock; and I am told that better time is made west than east of the mountains.

Great saving will accrue in the United States cavalry and transportation service by the adoption of this description of feed, and the overland stages and emigrants will be benefited by its use.

The meal of some other oily seeds may be substituted for that of the flaxseed, such as rape, colza, &c.

Having described my invention, what I claim as new, and desire to secure by Letters Patent, is—

The compound feed of ground grain and oil or flaxseed-meal, compressed into packages for transportation, substantially as described.

To the above specification of my improvement in compressed compound feed for stock I have signed my hand this 15th day of October, 1866.

CHAS. G. OTIS.

Witnesses:
SOLON C. KEMON,
A. TANNER.